(12) United States Patent
Lu et al.

(10) Patent No.: US 12,372,839 B2
(45) Date of Patent: Jul. 29, 2025

(54) COLOR FILTER AND PREPARATION METHOD THEREFOR, ARRAY SUBSTRATE AND DISPLAY DEVICE

(71) Applicant: BOE Technology Group Co., Ltd., Beijing (CN)

(72) Inventors: Xinhong Lu, Beijing (CN); Yan Qu, Beijing (CN); Ce Ning, Beijing (CN); Wei Yang, Beijing (CN); Zhanfeng Cao, Beijing (CN); Jingshang Zhou, Beijing (CN); Lizhong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/646,815

(22) Filed: Apr. 26, 2024

(65) Prior Publication Data
US 2024/0329472 A1    Oct. 3, 2024

Related U.S. Application Data

(63) Continuation of application No. PCT/CN2023/084525, filed on Mar. 28, 2023.

(51) Int. Cl.
  *G02F 1/1362* (2006.01)
  *G02F 1/1368* (2006.01)

(52) U.S. Cl.
  CPC .. *G02F 1/136222* (2021.01); *G02F 1/136209* (2013.01); *G02F 1/136286* (2013.01); *G02F 1/1368* (2013.01)

(58) Field of Classification Search
  CPC ......... G02F 1/136222; G02F 1/136209; G02F 1/136286; G02F 1/1368; G02F 1/133514;
  (Continued)

(56) References Cited

U.S. PATENT DOCUMENTS 5,558,927 A  *  9/1996  Aruga  .................... G02B 5/201
                                                          428/1.31
8,467,020 B2 *  6/2013  Shirai  ............... G02F 1/133514
                                                          349/110
(Continued)

FOREIGN PATENT DOCUMENTS

CN   103336620 A  * 10/2013
CN   203444130 U    2/2014
(Continued)

OTHER PUBLICATIONS

International Search Report for PCT/CN2023/084525 Mailed Dec. 27, 2023.

*Primary Examiner* — Nathanael R Briggs
(74) *Attorney, Agent, or Firm* — Ling Wu; Stephen Yang; Ling and Yang Intellectual Property

(57) ABSTRACT

A color filter, a preparation method therefore, an array substrate and a display device are provided. The color filter includes a plurality of filter units (20) provided on a base substrate (10) for transmitting light of different colors, and a light shielding layer (30) located between adjacent filter units (20) for transmitting light of different colors. The filter unit (20) includes a first surface facing the base substrate (10), a second surface facing away from the base substrate, and a third surface connecting the first surface and the second surface. The light shielding layer (30) is provided on the third surface of at least one of two adjacent filter units (20) transmitting light of different colors.

19 Claims, 12 Drawing Sheets

(58) Field of Classification Search
CPC ......... G02F 1/133516; G02F 1/133519; G02F 1/133512; G02F 1/1351
See application file for complete search history.

(56) References Cited

U.S. PATENT DOCUMENTS

| | | | |
|---|---|---|---|
| 2007/0187793 A1* | 8/2007 | Moon | H01L 27/14621 |
| | | | 430/7 |
| 2018/0095195 A1* | 4/2018 | Kim | G02B 5/003 |
| 2019/0219868 A1 | 7/2019 | Hui et al. | |
| 2021/0333617 A1* | 10/2021 | Huang | G02F 1/133514 |

FOREIGN PATENT DOCUMENTS

| | | | |
|---|---|---|---|
| CN | 104503128 A | | 4/2015 |
| CN | 106094326 A | | 11/2016 |
| CN | 106200040 A | | 12/2016 |
| CN | 111552112 A | | 8/2020 |
| CN | 114400245 A | | 4/2022 |
| JP | H06130218 A | * | 5/1994 |
| JP | H10260401 A | * | 9/1998 |
| JP | 2003344644 A | * | 12/2003 |
| JP | 2005283747 A | * | 10/2005 |
| JP | 2006071864 A | | 3/2006 |
| KR | 10-2014-0098401 A | | 8/2014 |

\* cited by examiner

COLOR FILTER AND PREPARATION METHOD THEREFOR, ARRAY SUBSTRATE AND DISPLAY DEVICE

CROSS-REFERENCE TO RELATED APPLICATIONS

This application is a continuation of International PCT Application No. PCT/CN2023/084525 filed on Mar. 28, 2023, which is hereby incorporated herein by reference in its entirety.

TECHNICAL FIELD

The present disclosure relates to, but is not limited to, the field of display technologies, and in particular to a color filter and a preparation method therefor, an array substrate and a display device.

BACKGROUND

For some liquid crystal display (LCD) products, due to the absorption of light by red/green/blue (R/G/B) color films, about ⅔ of the backlight is absorbed by RGB color films and is lost. If a non-absorption color separation filter can be effectively used, it is expected to improve the energy utilization rate of light. In addition, due to the limitations of materials, equipment and other conditions, the product resolution is difficult to be further improved depending on the color film technology based on traditional organic photoresist.

Dielectric thin film filter is a kind of laminated film composed of two or more films with low refractive index and high refractive index by using the interference principle of light in medium. If the dielectric thin film filter can be patterned by an Array process to form R/G/B dielectric film, there will be an opportunity to break through the limitations of existing color film technology on high pixel density (PPI) products, and especially it will be of great significance for near-eye display products such as virtual reality (VR). For LCD products, it is necessary to pattern the dielectric film formed on the substrate to form R/G/B dielectric film. However, there are several outstanding problems during the processing of inorganic color films. Firstly, the laminated structure and thickness of R/G/B dielectric films are different, so they need to be processed successively, but considering the processing complexity, the materials used need to be as same as possible, so there is a problem of damage to the previous layer of dielectric film in the subsequent processing process. Secondly, when the pixel density of products is improved, there will be the problem of cross-color between pixels.

SUMMARY

The following is a summary of subject matters described herein in detail. This summary is not intended to limit the protection scope of the claims.

An embodiment of the present disclosure provides a color filter, including a plurality of filter units provided on a base substrate for transmitting light of different colors, and a light shielding layer located between adjacent filter units for transmitting light of different colors. Each of the filter units includes a first surface facing the base substrate, a second surface facing away from the base substrate, and a third surface connecting the first surface and the second surface. The light shielding layer is provided on the third surface of at least one of two adjacent filter units for transmitting light of different colors.

An embodiment of the present disclosure further provides an array substrate, including the color filter and a circuit structure layer provided on a side of the plurality of filter units away from the base substrate. The circuit structure layer includes a transistor, a gate line, a data line and a first electrode. The transistor includes a gate electrode connected to the gate line, an active layer, a source electrode connected to the data line, and a drain electrode connected to the first electrode.

An embodiment of the present disclosure further provides a display device, including the color filter.

An embodiment of the present disclosure further provides a preparation method for a color filter, including:
 forming a plurality of first filter units on a base substrate, wherein each of the first filter units includes a first surface facing the base substrate, a second surface facing away from the base substrate, and a third surface connecting the first surface and the second surface;
 forming a first protective layer on a side of the plurality of first filter units away from the base substrate, wherein the first protective layer includes a plurality of first protective units that completely cover the first filter units;
 forming a plurality of second filter units on the base substrate, wherein each of the second filter units includes a first surface facing the base substrate, a second surface facing away from the base substrate, and a third surface connecting the first surface and the second surface;
 etching the plurality of first protective units to completely remove the first protective units on the second surfaces of the first filter units and at least partially retain the first protective units on the third surfaces of the first filter units, wherein the first protective units retained on the third surfaces of the first filter units are a first light shielding layer;
 forming a second protective layer on a side of the plurality of first filter units and the plurality of second filter units away from the base substrate, wherein the second protective layer includes a plurality of second protective units that cover adjacent first filter unit and second filter unit;
 forming a plurality of third filter units on the base substrate; and
 etching the plurality of second protective units to remove the second protective units on the second surfaces of the first filter units and the second protective units on the second surfaces of the second filter units, at least partially retain the second protective units on the third surfaces of the second filter units, and at least partially retain the second protective units on the first light shielding layer, wherein the second protective units retained on the third surfaces of the second filter units and the second protective units retained on the first light shielding layer are a second light shielding layer.

An embodiment of the present disclosure further provides a preparation method for a color filter, including:
 forming a plurality of first filter units on a base substrate, wherein each of the first filter units includes a first surface facing the base substrate, a second surface facing away from the base substrate, and a third surface connecting the first surface and the second surface;
 forming a first protective layer on a side of the plurality of first filter units away from the base substrate, wherein the first protective layer includes a plurality of first protective units that completely cover the first filter units;

forming a plurality of second filter units on the base substrate, wherein a second filter unit at least partially covers a first protective unit on a third surface of a first filter unit adjacent thereto, each of the second filter units includes a first surface facing the base substrate, a second surface facing away from the base substrate, and a third surface connecting the first surface and the second surface;

etching the plurality of first protective units to remove the first protective units on the second surfaces of the first filter units and retain the first protective units covered by the second filter units on the third surfaces of the first filter units, wherein the first protective units retained on the third surfaces of the first filter units are a first light shielding layer;

forming a second protective layer on a side of the plurality of first filter units and the plurality of second filter units away from the base substrate, wherein the second protective layer includes a plurality of second protective units that cover adjacent first filter unit and second filter unit;

forming a plurality of third filter units on the base substrate, wherein a third filter unit at least partially covers a second protective unit on a third surface of a first filter unit adjacent thereto, and the third filter unit at least partially covers a second protective unit on a third surface of a second filter unit adjacent thereto; and etching the plurality of second protective units to remove the second protective units on the second surfaces of the first filter units and the second protective units on the second surfaces of the second filter units, retain the second protective units covered by the third filter units on the third surfaces of the first filter units, and retain the second protective units covered by the third filter units on the third surfaces of the second filter units, wherein the second protective units retained on the third surfaces of the first filter units and the second protective units retained on the third surfaces of the second filter units are a second light shielding layer.

An embodiment of the present disclosure further provides a preparation method for a color filter, including:

forming a light shielding layer on a base substrate, wherein the light shielding layer is of a grid-like structure;

forming a plurality of first filter units on the base substrate, wherein the plurality of first filter units are located in a plurality of first grid holes of the light shielding layer;

forming a first protective layer on a side of the plurality of first filter units away from the base substrate, wherein the first protective layer includes a plurality of first protective units that completely cover the first filter units;

forming a plurality of second filter units on the base substrate, wherein the plurality of second filter units are located in a plurality of second grid holes of the light shielding layer;

removing the plurality of first protective units to expose a surface of the first filter units away from the base substrate;

forming a second protective layer on a side of the plurality of first filter units and the plurality of second filter units away from the base substrate, wherein the second protective layer includes a plurality of second protective units that cover adjacent first filter unit and second filter unit;

forming a plurality of third filter units on the base substrate, wherein the plurality of third filter units are located in a plurality of third grid holes of the light shielding layer; and removing the plurality of second protective units to expose a surface of the first filter units away from the base substrate and a surface of the second filter units away from the base substrate.

Other aspects of the present disclosure may be comprehended after the drawings and the detailed descriptions are read and understood.

BRIEF DESCRIPTION OF THE DRAWINGS

Accompanying drawings are intended to provide further understanding of technical solutions of the present disclosure and form a part of the specification, and are used to explain the technical solutions of the present disclosure together with embodiments of the present disclosure, but do not form limitations on the technical solutions of the present disclosure. Shapes and sizes of components in the drawings do not reflect actual scales, and are only intended to schematically illustrate contents of the present disclosure.

FIG. 5a-1 is a schematic diagram of a partial cross-sectional structure of a color filter after forming a plurality of first filter units according to some exemplary embodiments;

FIG. 5a-2 is a schematic top view of a structure of a color filter after forming a plurality of first filter units according to some exemplary embodiments;

FIG. 5e-1 is a schematic diagram of a partial cross-sectional structure of a color filter after forming a first light shielding layer according to some exemplary embodiments;

FIG. 5e-2 is a schematic top view of a structure of a color filter after forming a first light shielding layer according to some exemplary embodiments;

FIG. 6a-1 is a schematic diagram of a partial cross-sectional structure of a color filter after forming a plurality of first filter units according to some other exemplary embodiments;

FIG. 6a-2 is a schematic top view of a structure of a color filter after forming a plurality of first filter units according to some other exemplary embodiments;

FIG. 6e-1 is a schematic diagram of a partial cross-sectional structure of a color filter after forming a first light shielding layer according to some other exemplary embodiments;

FIG. 6e-2 is a schematic top view of a structure of a color filter after forming a first light shielding layer according to some other exemplary embodiments;

FIG. 7a-1 is a schematic diagram of a partial cross-sectional structure of a color filter after forming a light shielding layer according to some further exemplary embodiments;

FIG. 7a-2 is a schematic top view of a structure of a color filter after forming a light shielding layer according to some further exemplary embodiments;

FIG. 7d-1 is a schematic diagram of a partial cross-sectional structure of a color filter after forming a plurality of first filter units according to some further exemplary embodiments;

FIG. 7d-2 is a schematic top view of a structure of a color filter after forming a plurality of first filter units according to some further exemplary embodiments;

DETAILED DESCRIPTION

Those of ordinary skills in the art should understand that modifications or equivalent replacements may be made to the technical solutions of the embodiments of the present disclosure without departing from the spirit and scope of the technical solutions of the embodiments of the present disclosure, and should all fall within the scope of the claims of the present disclosure.

Figure 1:
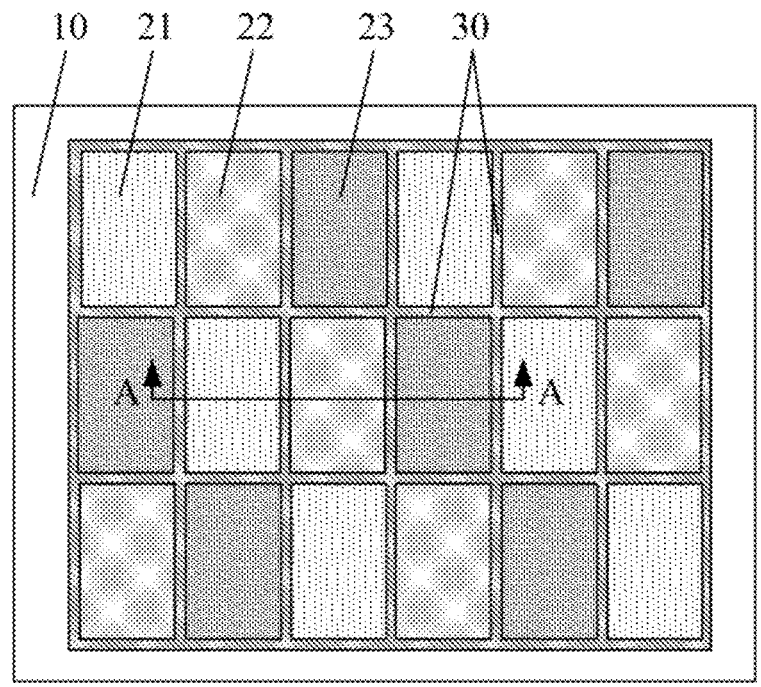
FIG. 1 is a schematic top view of a structure of a color filter layer according to some exemplary embodiments.
Figure 2:
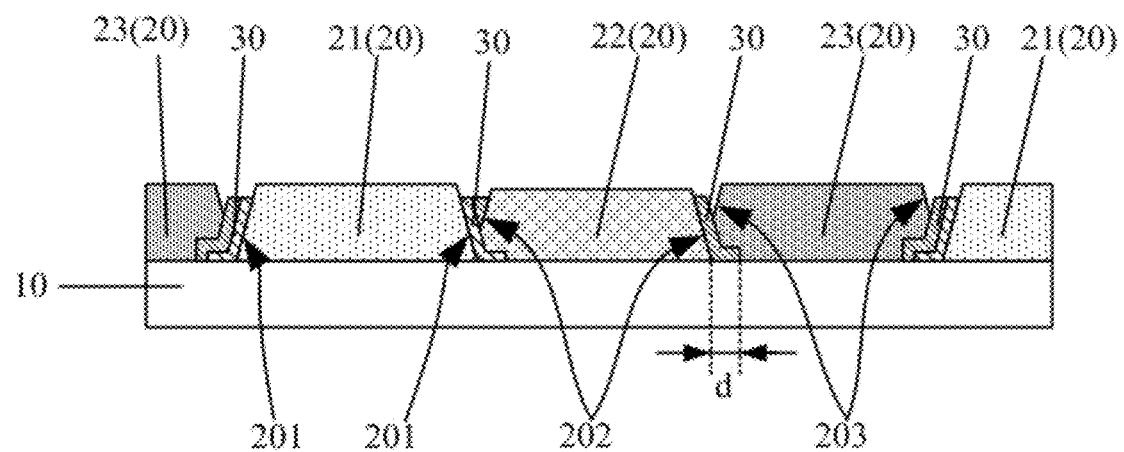
FIG. 2 is a schematic diagram of a cross-sectional structure taken along A-A of FIG. 1 according to some exemplary embodiments.
Figure 3:
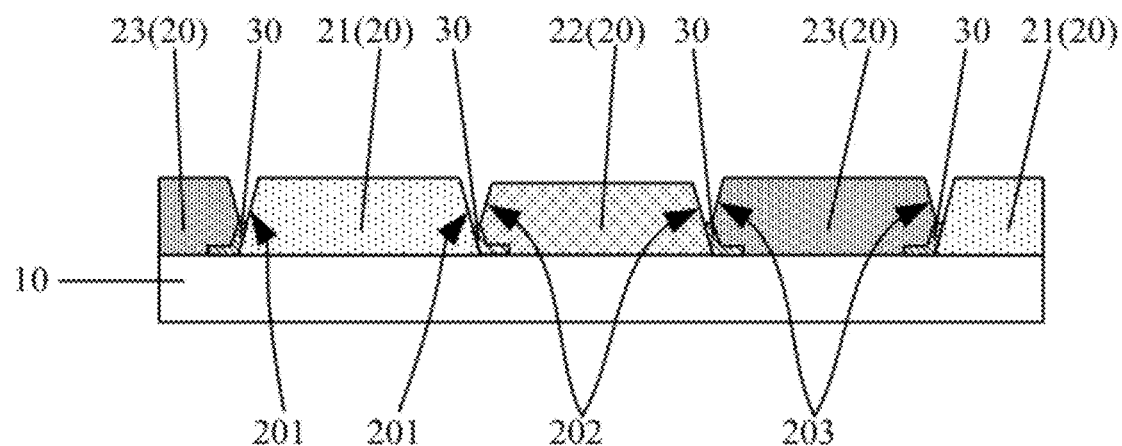
FIG. 3 is a schematic diagram of a cross-sectional structure taken along A-A of FIG. 1 according to some other exemplary embodiments.

As shown in FIGS. 1, 2 and 3, FIG. 1 is a schematic top view of a structure of a color filter layer according to some exemplary embodiments, FIG. 2 is a schematic diagram of a cross-sectional structure taken along A-A of FIG. 1 in some exemplary embodiments, and FIG. 3 is a schematic diagram of a cross-sectional structure taken along A-A of FIG. 1 in some other exemplary embodiments. A color filter includes a plurality of filter units 20 provided on a base substrate 10 that transmit light of different colors (a plurality of first filter units 21 that transmit light of a first color, a plurality of second filter units 22 that transmit light of a second color, and a plurality of third filter units 23 that transmit light of a third color are illustrated in FIG. 1), and a light shielding layer 30 located between adjacent filter units 20 that transmit light of different colors. The filter unit 20 includes a first surface facing the base substrate 10, a second surface facing away from the base substrate 10, and a third surface connecting the first surface and the second surface (a third surface 201 of the first filter unit 21, a third surface 202 of the second filter unit 22, and a third surface 203 of the third filter unit 23 are illustrated in FIG. 2). The light shielding layer 30 is provided on the third surface of at least one of two adjacent filter units 20 that transmit light of different colors.

According to the color filter of the embodiment of the present disclosure, by providing the light shielding layer 30, the problem of light crosstalk between two adjacent filter units transmitting light of different colors can be avoided. In addition, the light shielding layer 30 is provided on the third surface of the filter unit, such that during the preparation of a color filter according to some exemplary embodiments, after a filter unit that transmits light of a certain color is formed, a protective film layer covering the filter unit may be formed. The protective film layer may avoid damage to the previously formed filter unit during the subsequent preparation of other types of filter units, and the protective film layer may be removed by an etching process after the subsequent filter unit is prepared. The protective film layer may be retained on the third surface of the filter unit during the etching process, and the protective film layer retained on the third surface of the filter unit may serve as the light shielding layer 30. Therefore, by providing the light shielding layer 30 on the third surface of the filter unit, it is possible to protect the previously prepared filter unit and form the light shielding layer 30 by the same film layer in the preparation process of the color filter according to some exemplary embodiments, and to simplify the preparation process of the color filter while preventing the previously prepared filter unit from being damaged in a subsequent process.

In some exemplary embodiments, as shown in FIG. 2, a slope angle of the third surface of at least one of two adjacent filter units transmitting light of different colors is 70 degrees to 90 degrees.

When dry etching a film layer covering a pattern with a large slope angle, due to a large absolute thickness of the pattern with a large slope angle in a direction perpendicular to the base substrate 10, the etched film layer is likely to remain at a position of the large slope angle. Thus, in some embodiments, the light shielding layer 30 may be formed on the third surface of the filter unit by utilizing the large slope angle of the third surface of the filter unit.

In some exemplary embodiments, as shown in FIGS. 1 and 2, the plurality of filter units include a plurality of first filter units 21 that transmit light of a first color, a plurality of second filter units 22 that transmit light of a second color, and a plurality of third filter units 23 that transmit light of a third color. The light shielding layer 30 may not be provided on the third surface of the plurality of first filter units 21 or the third surface of the plurality of second filter units 22 or the third surface of the plurality of third filter units 23. For example, in the example of FIG. 2, the light shielding layer 30 is provided on both the third surface 201 of the first filter unit 21 and the third surface 202 of the second filter unit 22, and the light shielding layer 30 is not provided on the third surface 203 of the third filter unit 23.

In some examples of the present embodiment, as shown in FIG. 2, the first filter unit 21 or the second filter unit 22 or the third filter unit 23 is used as a reference filter unit. The light shielding layer 30 between the reference filter unit and the filter unit adjacent thereto includes a first light shielding layer 31 and a second light shielding layer 32. The first light shielding layer 31 is provided on the third surface of the reference filter unit, and the second light shielding layer 32 is provided at least partially on a side of the first light shielding layer 31 away from the reference filter unit. For example, in the example of FIG. 2, the first filter unit 21 is the reference filter unit.

In some exemplary embodiments, as shown in FIG. 2, at least two adjacent filter units transmitting light of different colors have overlapping portions, and an orthographic projection of the light shielding layer 30 on the base substrate 10 includes an orthographic projection of the overlapping portions on the base substrate 10.

In some exemplary embodiments, as shown in FIG. 2, orthographic projections of the third surfaces of at least two adjacent filter units transmitting light of different colors on the base substrate 10 overlap, and orthographic projections of the second surfaces of the at least two adjacent filter units transmitting light of different colors on the base substrate 10 do not overlap.

In some exemplary embodiments, as shown in FIG. 2, a material of the light shielding layer 30 may be a metal, and a thickness of the light shielding layer 30 may not be less than 500 Å, so as to ensure the light-shielding effect.

In some exemplary embodiments, as shown in FIG. 3, adjacent filter units transmitting light of different colors have overlapping portions, and the light shielding layer 30 is at least partially located between the overlapping portions.

In some examples of the present embodiment, as shown in FIG. 3, a portion of the light shielding layer 30 is located on a third surface of an overlapping portion, and the other portion of the light shielding layer 30 extends in a direction parallel to the base substrate 10. The light shielding layer 30 may not be provided on third surfaces of non-overlapping portions of adjacent filter units transmitting light of different colors.

In some exemplary embodiments, as shown in FIGS. 2 and 3, the light shielding layer 30 completely covers an edge of the third surface close to the base substrate 10 and partially extends in a direction parallel to the base substrate 10. In this way, the light shielding effect may be improved, and light crosstalk between adjacent filter units transmitting light of different colors may be reduced.

In some examples of the present embodiment, the light shielding layer 30 may extend from 0.5 um to 3 um in the direction parallel to the base substrate 10. That is, in FIG. 2, d is from 0.5 um to 3 um, so that a better light shielding effect may be achieved.

In some exemplary embodiments, as shown in FIG. 2, the first filter unit 21 may transmit red light and reflect light of other colors except red light, the second filter unit 22 may transmit green light and reflect light of other colors except green light, and the third filter unit 23 may transmit blue light and reflect light of other colors except blue light. The plurality of filter units of the color filter may include only three types of filter units that transmit red light, green light and blue light, respectively. The plurality of filter units of the color filter may include a plurality of groups of filter units, and each group of filter units include a first filter unit 21, a second filter unit 22 and a third filter unit 23. The three filter units of each group of filter units may be arranged in a "—" shape or in a "品" shape. In other embodiments, the plurality of filter units of the color filter may include four types of filter units that transmit red light, green light, blue light, and white light (or yellow light), respectively. The type and arrangement of the filter units of the color filter are not limited in the present disclosure.

Figure 4:
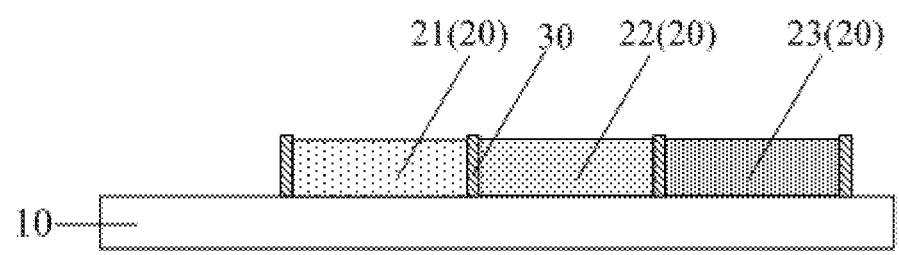
FIG. 4 is a schematic diagram of a cross-sectional structure taken along A-A of FIG. 1 according to some further exemplary embodiments.

In some exemplary embodiments, as shown in FIG. 4, which is a schematic diagram of a cross-sectional structure taken along A-A of FIG. 1 according to some further exemplary embodiments, the light shielding layer 30 is of a grid-like structure and a material of the light shielding layer 30 is copper.

In some exemplary embodiments, the first filter unit 21, the second filter unit 22, and the third filter unit 23 may each include a plurality of stacked inorganic film layers including at least one low refractive index film layer and at least one high refractive index film layer. A material of the low refractive index film layer may be silicon dioxide ($SiO_2$), magnesium fluoride ($MgF_2$), and the like. A material of the high refractive index film layer may be silicon nitride (SiN), titanium dioxide ($TiO_2$), titanium pentoxide ($Ti_2O_5$), niobium pentoxide ($Nb_2O_5$), zirconia ($ZrO_2$), yttrium trioxide ($Y_2O_3$), zinc sulfide (ZnS), and the like. Thicknesses of the first filter unit 21, the second filter unit 22 and the third filter unit 23 may be 3000 Å to 30000 Å, and the thicknesses may be 5000 Å to 15000 Å considering the thin film stress and the filtering effect. The first filter unit 21 may transmit light of a first color and reflect light of other colors except the light of the first color, the second filter unit 22 may transmit light of a second color and reflect light of other colors except the light of the second color, and the third filter unit 23 may transmit light of a third color and reflect light of other colors except the light of the third color. Thus, in some products to which the color filter of the present example is applied, such as a liquid crystal display device, the light reflected by the color filter may be reflected by a backlight assembly and re-entered the color filter, which may improve the utilization rate of the light.

In some exemplary embodiments, the base substrate 10 may be a transparent hard substrate or a transparent soft substrate, such as a glass substrate, a polyimide (PI) substrate, or the like.

A structure of the color filter will be illustrated below through a preparation process of the color filter. A "patterning process" mentioned in the present disclosure includes photoresist coating, mask exposure, development, etching, photoresist stripping, etc., for a metal material, an inorganic material, or a transparent conductive material, and includes organic material coating, mask exposure, development, etc., for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film made of a certain material on a base substrate through a process such as deposition, coating, etc. If the "thin film" does not need a patterning process in an entire preparation process, the "thin film" may also be called a "layer". If the "thin film" needs to be processed by a patterning process in the entire preparation process, the "thin film" is called a "thin film" before the patterning process is performed and is called a "layer" after the patterning process is performed. At least one "pattern" is contained in the "layer" which has been processed through the patterning process. A "thickness" of a film layer is a dimension of the film layer in a direction perpendicular to the base substrate. In an exemplary embodiment of the present disclosure, "an orthographic projection of B is within a range of an orthographic projection of A" or "an orthographic projection of A contains an orthographic projection of B" means that a boundary of the orthographic projection of B falls within a range of a boundary of the orthographic projection of A, or the boundary of the orthographic projection of A coincides with the boundary of the orthographic projection of B.

In some exemplary embodiments, taking the color filter illustrated in FIG. 2 as an example, the preparation process of the color filter may include the following operations.

Figures 1, 5A:
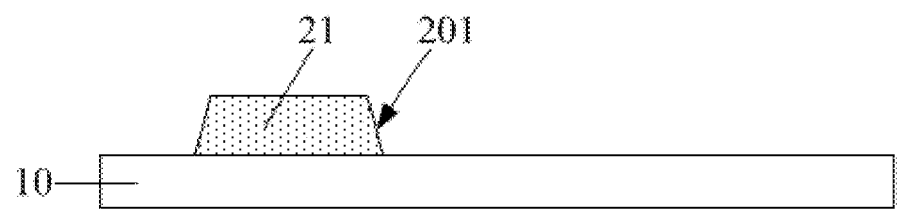
Figures 2, 5A:
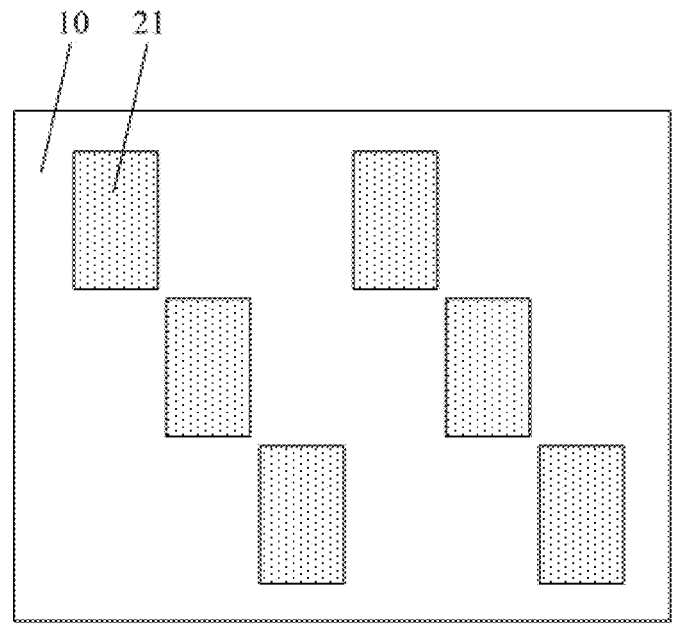

(1) A plurality of layers of dielectric films are deposited on a glass substrate 10 to form a first filter thin film, and the first filter thin film is patterned to form a plurality of first filter units 21, as shown in FIGS. 5a-1 and 5a-2. FIG. 5a-1 is a schematic diagram of a partial cross-sectional structure of a color filter after forming a plurality of first filter units 21 according to some exemplary embodiments, and FIG. 5a-2 is a schematic top view of a structure of a color filter after forming a plurality of first filter units 21 according to some exemplary embodiments. FIG. 5a-1 illustrates one first filter unit 21, and FIG. 5a-2 illustrates a plurality of first filter units 21.

Exemplarily, the first filter unit 21 includes a first surface facing the base substrate 10, a second surface facing away from the base substrate 10, and a third surface 201 connecting the first surface and the second surface. A cross-sectional shape of the first filter unit 21 may be trapezoidal.

Dry etching may be employed in the patterning process of this step so that a slope angle of the third surface 201 of the plurality of first filter units 21 formed is 70 degrees to 90 degrees.

Figure 5B:
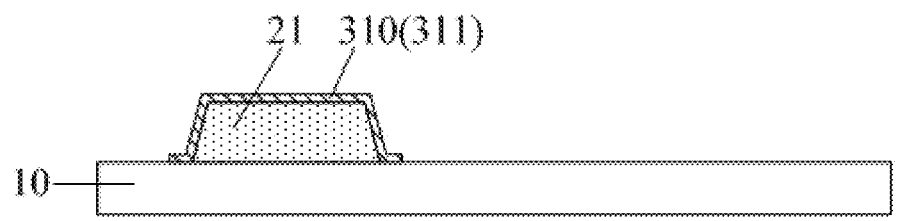
FIG. 5b is a schematic diagram of a partial cross-sectional structure of a color filter after forming a first protective layer according to some exemplary embodiments.

(2) A first protective thin film is deposited on the base substrate 10 on which the aforementioned pattern has been formed, and the first protective thin film is patterned to form a first protective layer 310. The first protective layer 310 includes a plurality of first protective units 311, which correspondingly cover the plurality of first filter units 21, and the second surface and the third surface 201 of each first filter unit 21 are completely covered by a first protective unit 311. The first protective units 311 may prevent damage to the first filter units 21 during subsequent preparation of a second filter unit 22 or a third filter unit 23. As shown in FIG. 5b, a first filter unit 21 and a first protective unit 311 are illustrated in FIG. 5b.

Exemplarily, a material of the first protective unit 311 may be a metal, such as molybdenum (Mo), titanium (Ti), and the like, which are easy to be dry-etched. In addition, for light shielding purposes, a thickness of the metal layer may not be less than 500 Å, and an edge of each first protective unit 311 may exceed an edge of the first surface of the first filter unit 21 by 0.5 um to 3 um.

Figure 5C:
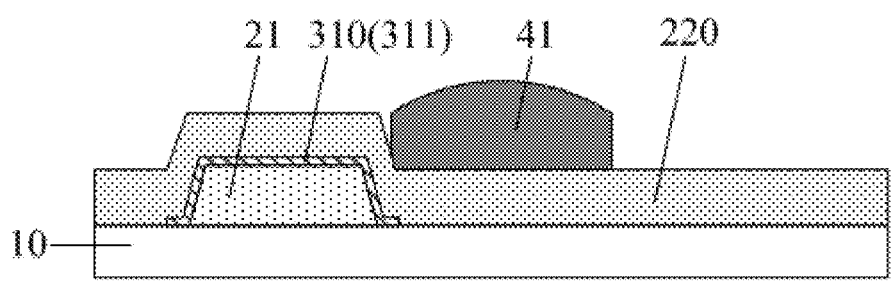
FIG. 5c is a schematic diagram of a partial cross-sectional structure of a color filter after forming a first photoresist according to some exemplary embodiments.
Figure 5D:
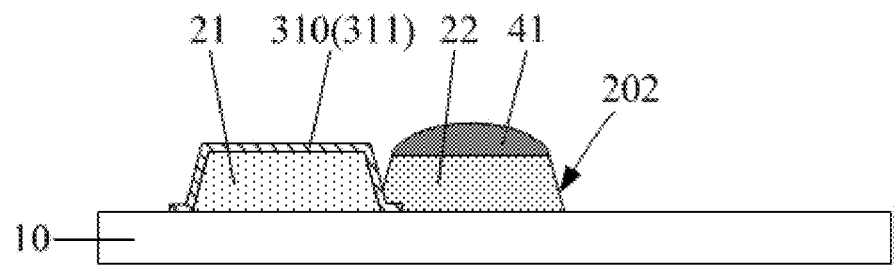
FIG. 5d is a schematic diagram of a partial cross-sectional structure of a color filter after forming a plurality of second filter units according to some exemplary embodiments.

(3) A plurality of layers of dielectric films are deposited on the base substrate 10 on which the aforementioned patterns have been formed to form a second filter thin film 220, and the second filter thin film 220 is patterned to form a plurality of second filter units 22. Exemplarily, each of the second filter units 22 includes a first surface facing the base substrate 10, a second surface facing away from the base substrate 10, and a third surface 202 connecting the first surface and the second surface. A cross-sectional shape of the second filter unit 22 may be trapezoidal. A slope angle of the third surface 202 of the second filter unit 22 may be 70 degrees to 90 degrees. Adjacent second filter unit 22 and first filter unit 21 may overlap, as shown in FIGS. 5c and 5d. The process of patterning the second filter thin film 220 to form the plurality of second filter units 22 may include processes of photoresist coating, mask exposure, development, etching, and the like. The photoresist (first photoresist 41) after development in this process is illustrated in FIGS. 5c and 5d.

Figures 1, 5E:
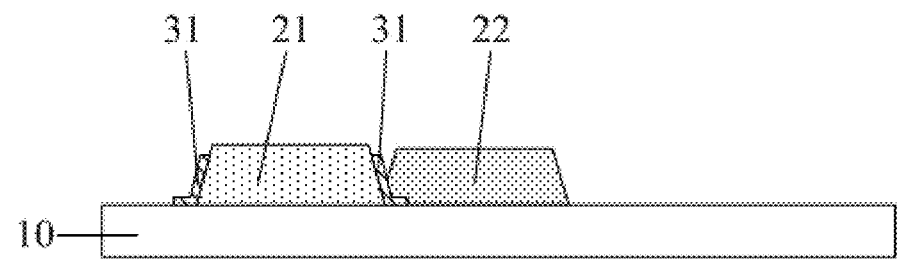
Figures 2, 5E:
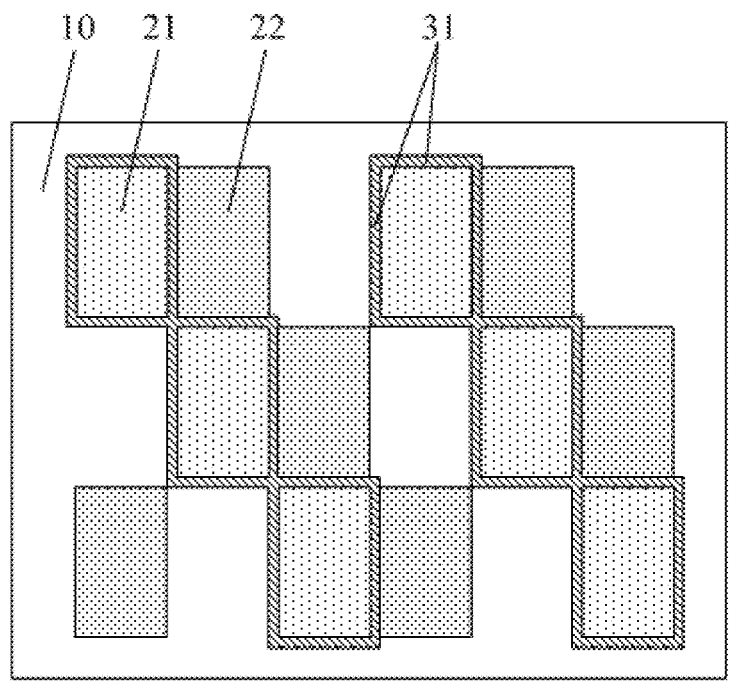

Subsequently, the plurality of first protective units 311 are etched and a first light shielding layer 31 is formed. When dry etching a film layer covering a pattern with a large slope angle, due to a large absolute thickness of the pattern with a large slope angle in a direction perpendicular to the base substrate 10, the etched film layer is likely to remain at a position of the large slope angle. Therefore, after etching the first protective units 311 on the first filter units 21, the first protective units 311 may be retained on the third surfaces 201 of the first filter units 21, and the retained first protective units 311 are the first light shielding layer 31, as shown in FIGS. 5e-1 and 5e-2. FIG. 5e-1 is a schematic diagram of a partial cross-sectional structure of a color filter after forming a first light shielding layer 31 according to some exemplary embodiments, and FIG. 5e-2 is a schematic top view of a structure of a color filter after forming a first light shielding layer 31 according to some exemplary embodiments.

Figure 5F:
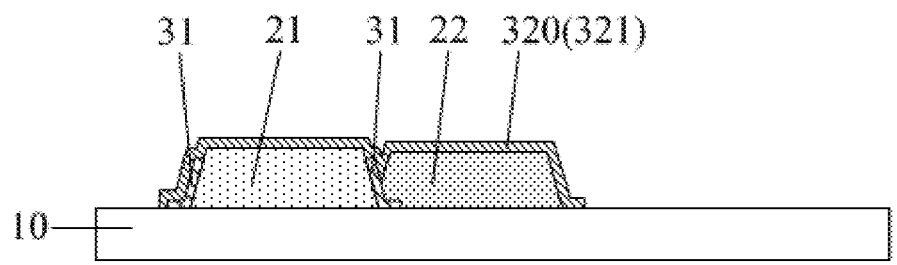
FIG. 5f is a schematic diagram of a partial cross-sectional structure of a color filter after forming a second protective layer according to some exemplary embodiments.

(4) A second protective thin film is deposited on the base substrate 10 on which the aforementioned patterns have been formed, and the second protective thin film is patterned to form a second protective layer 320. The second protective layer 320 includes a plurality of second protective units 321, each second protective unit 321 completely covers a first filter unit 21 and a second filter unit 22 adjacent to the first filter unit 21, and a portion of each second protective unit 321 covers the first light shielding layer 31. The second protective unit 321 may prevent damage to the first filter unit 21 and the second filter unit 22 during subsequent preparation of a third filter unit 23. As shown in FIG. 5f, a second protective unit 321 is illustrated in FIG. 5f.

Exemplarily, a material of the second protective unit 321 may be a metal, such as molybdenum (Mo), titanium (Ti), and the like, which are easy to be dry-etched. The material of the second protective unit 321 may be the same as that of the first protective unit 311. In addition, for light shielding purposes, a thickness of the second protective unit 321 may not be less than 500 Å, and an edge of each second protective unit 321 may exceed an edge of the first surface of the second filter unit 22 by 0.5 um to 3 um.

Figure 5G:
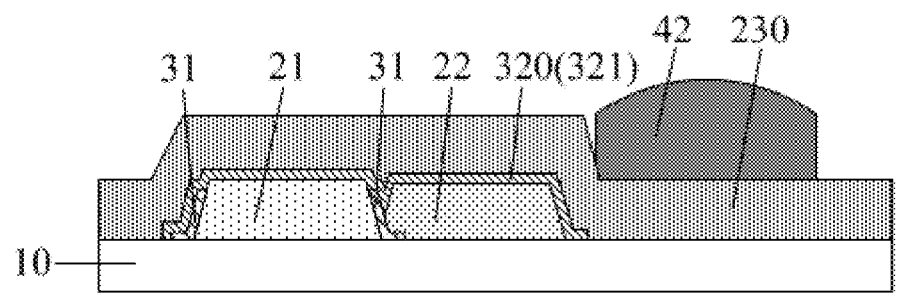
FIG. 5g is a schematic diagram of a partial cross-sectional structure of a color filter after forming a second photoresist according to some exemplary embodiments.
Figure 5H:
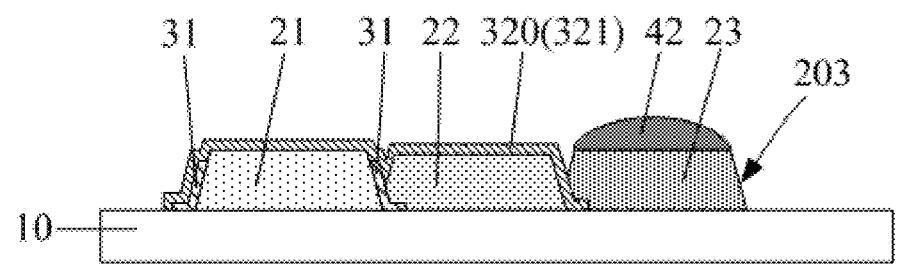
FIG. 5h is a schematic diagram of a partial cross-sectional structure of a color filter after forming a plurality of third filter units according to some exemplary embodiments.

(5) A plurality of layers of dielectric films are deposited on the base substrate 10 on which the aforementioned patterns have been formed to form a third filter thin film 230, and the third filter thin film 230 is patterned to form a plurality of third filter units 23. Exemplarily, each of the third filter units 23 includes a first surface facing the base substrate 10, a second surface facing away from the base substrate 10, and a third surface 203 connecting the first surface and the second surface. A cross-sectional shape of the third filter unit 23 may be trapezoidal. Adjacent third filter unit 23 and second filter unit 22 may overlap, and adjacent third filter unit 23 and first filter unit 21 may overlap. For high PPI products, adjacent filter units transmitting light of different colors will inevitably overlap, as shown in FIGS. 5g and 5h. The process of patterning the third filter thin film 230 to form the plurality of third filter units 23 may include processes of photoresist coating, mask exposure, development, etching, and the like. The photoresist (second photoresist 42) after development in this process is illustrated in FIGS. 5g and 5h.

Figure 5I:
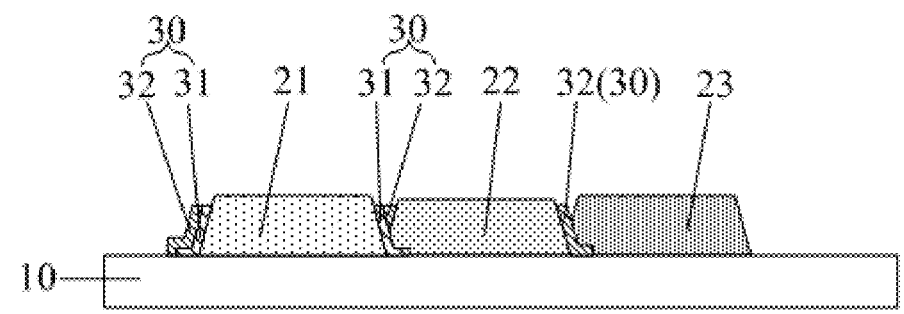
FIG. 5i is a schematic diagram of a partial cross-sectional structure of a color filter after forming a second light shielding layer according to some exemplary embodiments.

Subsequently, the plurality of second protective units 321 are etched and a second light shielding layer 32 is formed. After etching the second protective units 321 on the first filter units 21 and the second filter units, the second protective units 321 will be retained on the first light shielding layer 31 and the third surfaces 202 of the second filter units 22, and the retained second protective units 321 are the second light shielding layer 32. The light shielding layer 30 between adjacent first filter unit 21 and second filter unit 22 includes a first light shielding layer 31 and a second light shielding layer 32. The light shielding layer 30 between adjacent first filter unit 21 and third filter unit 23 includes a first light shielding layer 31 and a second light shielding layer 32. The light shielding layer 30 between adjacent second filter unit 22 and third filter unit 23 is the second light shielding layer 32, as shown in FIGS. 5i and 2.

Based on the color filter illustrated in FIG. 2 and the preparation process of the color filter illustrated in FIGS. 5a to 5i, an embodiment of the present disclosure further provides a preparation method for a color filter, including:
  forming a plurality of first filter units on a base substrate, each of the first filter units including a first surface facing the base substrate, a second surface facing away from the base substrate, and a third surface connecting the first surface and the second surface;
  forming a first protective layer on a side of the plurality of first filter units away from the base substrate, the first protective layer including a plurality of first protective units that completely cover the first filter units;
  forming a plurality of second filter units on the base substrate, each of the second filter units including a first surface facing the base substrate, a second surface facing away from the base substrate, and a third surface connecting the first surface and the second surface;
  etching the plurality of first protective units to completely remove the first protective units on the second surfaces of the first filter units and at least partially retain the first protective units on the third surfaces of the first filter units, the first protective units retained on the third surfaces of the first filter units being a first light shielding layer;
  forming a second protective layer on a side of the plurality of first filter units and the plurality of second filter units away from the base substrate, the second protective layer including a plurality of second protective units that cover adjacent first filter unit and second filter unit;
  forming a plurality of third filter units on the base substrate; and
  etching the plurality of second protective units to remove the second protective units on the second surfaces of the first filter units and the second protective units on the second surfaces of the second filter units, at least partially retain the second protective units on the third surfaces of the second filter units, and at least partially retain the second protective units on the first light shielding layer, the second protective units retained on the third surfaces of the second filter units and the second protective units retained on the first light shielding layer being a second light shielding layer.

In some other exemplary embodiments, taking the color filter illustrated in FIG. 3 as an example, the preparation process of the color filter may include the following operations.

Figures 1, 6A:
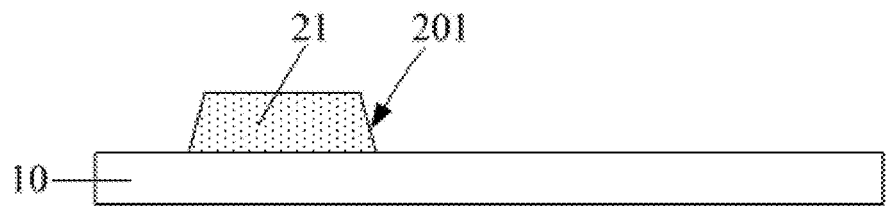
Figures 2, 6A:
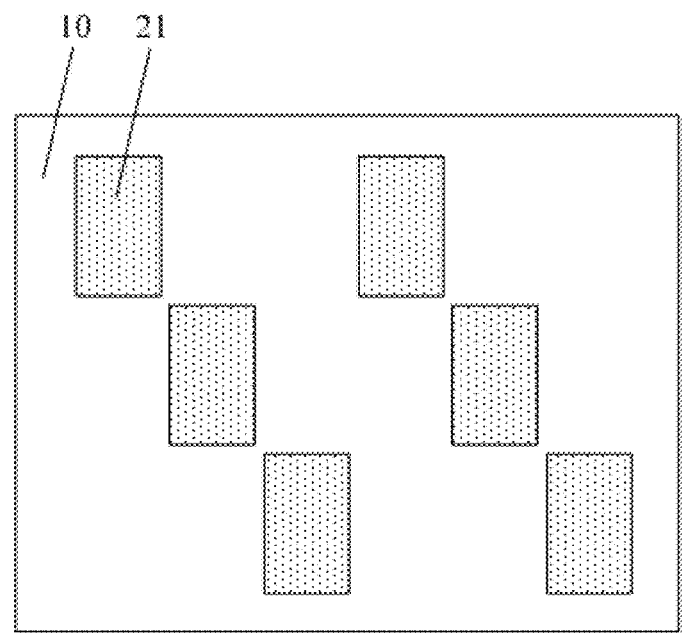

(1) A plurality of layers of dielectric films are deposited on a glass substrate 10 to form a first filter thin film, and the first filter thin film is patterned to form a plurality of first filter units 21, as shown in FIGS. 6a-1 and 6a-2. FIG. 6a-1 is a schematic diagram of a partial cross-sectional structure of a color filter after forming a plurality of first filter units 21 according to some exemplary embodiments, and FIG. 6a-2 is a schematic top view of a structure of a color filter after forming a plurality of first filter units 21 according to some exemplary embodiments. FIG. 6a-1 illustrates one first filter unit 21, and FIG. 6a-2 illustrates a plurality of first filter units 21.

Exemplarily, the first filter unit 21 includes a first surface facing the base substrate 10, a second surface facing away from the base substrate 10, and a third surface 201 connecting the first surface and the second surface. A cross-sectional shape of the first filter unit 21 may be trapezoidal.

Dry etching may be employed in the patterning process of this step so that a slope angle of the third surface 201 of the plurality of first filter units 21 formed is 70 degrees to 90 degrees.

Figure 6B:
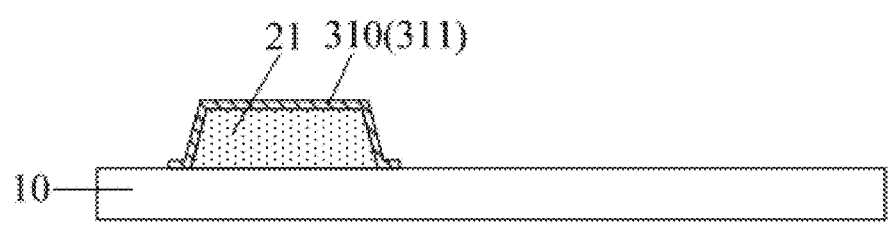
FIG. 6b is a schematic diagram of a partial cross-sectional structure of a color filter after forming a first protective layer according to some other exemplary embodiments.

(2) A first protective thin film is deposited on the base substrate 10 on which the aforementioned pattern has been formed, and the first protective thin film is patterned to form a first protective layer 310. The first protective layer 310 includes a plurality of first protective units 311, which correspondingly cover the plurality of first filter units 21, and the second surface and the third surface 201 of each first filter unit 21 are completely covered by a first protective unit 311. The first protective units 311 may prevent damage to the first filter units 21 during subsequent preparation of a second filter unit 22 or a third filter unit 23. As shown in FIG. 6b, a first filter unit 21 and a first protective unit 311 are illustrated.

Exemplarily, a material of the first protective unit 311 may be a metal, such as copper (Cu), aluminum (Al), molybdenum-niobium alloy (MoNb), molybdenum-nickel-titanium alloy (MoNiTi), or the like, which are not easy to be dry-etched. In addition, for light shielding purposes, a thickness of the metal layer may not be less than 500 Å, and an edge of each first protective unit 311 may exceed an edge of the first surface of the first filter unit 21 by 0.5 um to 3 um.

Figure 6C:
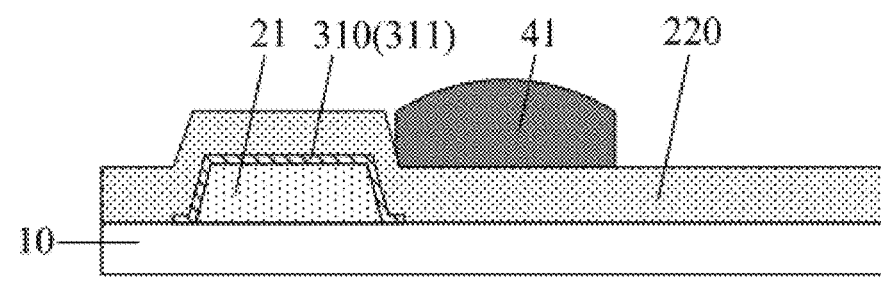
FIG. 6c is a schematic diagram of a partial cross-sectional structure of a color filter after forming a first photoresist according to some other exemplary embodiments.
Figure 6D:
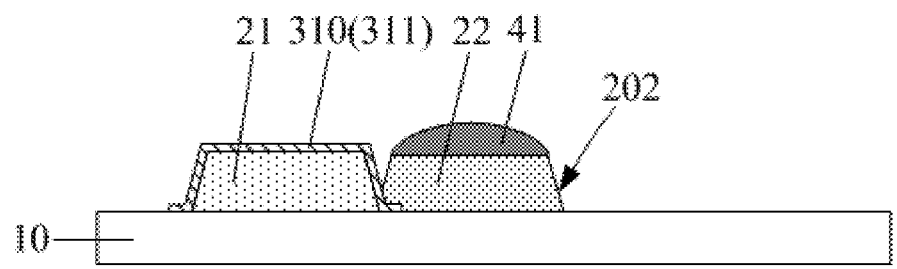
FIG. 6d is a schematic diagram of a partial cross-sectional structure of a color filter after forming a plurality of second filter units according to some other exemplary embodiments.

(3) A plurality of layers of dielectric films are deposited on the base substrate 10 on which the aforementioned patterns have been formed to form a second filter thin film 220, and the second filter thin film 220 is patterned to form a plurality of second filter units 22. A second filter unit 22 overlaps the third surface 201 of the first filter unit 21 adjacent thereto, and the second filter unit 22 at least partially covers the first protective unit 311 on the third surface 201 of the first filter unit 21 adjacent thereto. Exemplarily, the second filter unit 22 covers the first protective unit 311 on the third surface 201 of the first filter unit 21 adjacent thereto at an end close to the base substrate 10. The second filter unit 22 includes a first surface facing the base substrate 10, a second surface facing away from the base substrate 10, and a third surface 202 connecting the first surface and the second surface. A cross-sectional shape of the second filter unit 22 may be trapezoidal. A slope angle of the third surface 202 of the second filter unit 22 may be 70 degrees to 90 degrees, as shown in FIGS. 6c and 6d. The process of patterning the second filter thin film 220 to form the plurality of second filter units 22 may include processes of photoresist coating, mask exposure, development, etching, and the like. The photoresist (first photoresist 41) after development in this process is illustrated in FIGS. 6c and 6d.

Figures 1, 6E:
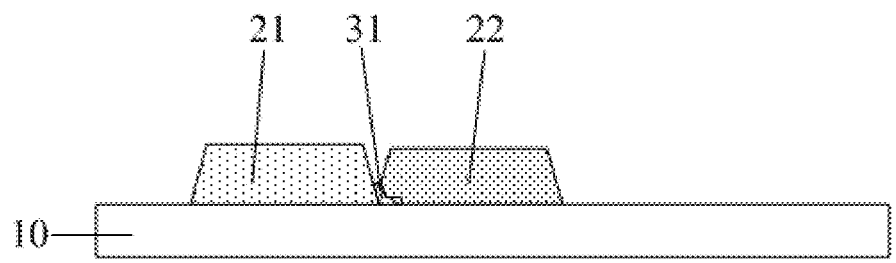
Figures 2, 6E:
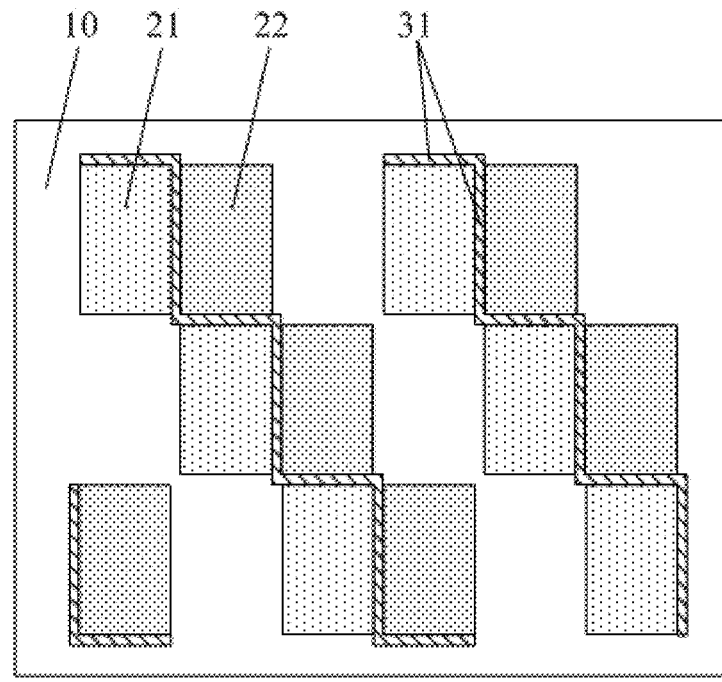

Subsequently, the plurality of first protective units 311 may be etched by wet etching to remove the first protective units 311 on the second surfaces of the first filter units 21 and retain the first protective units 311 covered by the second filter units 22 on the third surfaces 201 of the first filter units 21. The first protective units 311 retained on the third surfaces 201 of the first filter units 21 is a first light shielding layer 31, which is located on the third surfaces 201 of the first filter units 21 and covered by the second filter units 22, as shown in FIGS. 6e-1 and 6e-2. FIG. 6e-1 is a schematic diagram of a partial cross-sectional structure of a color filter after forming a first light shielding layer 31 according to some exemplary embodiments, and FIG. 6e-2 is a schematic top view of a structure of a color filter after forming a first light shielding layer 31 according to some exemplary embodiments.

Figure 6F:
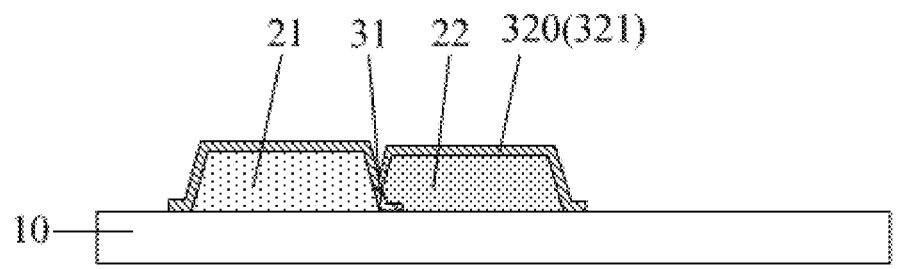
FIG. 6f is a schematic diagram of a partial cross-sectional structure of a color filter after forming a second protective layer according to some other exemplary embodiments.

(4) A second protective thin film is deposited on the base substrate 10 on which the aforementioned patterns have been formed, and the second protective thin film is patterned to form a second protective layer 320. The second protective layer 320 includes a plurality of second protective units 321, and each second protective unit 321 completely covers a first filter unit 21 and a second filter unit 22 adjacent to the first filter unit 21. The second protective unit 321 may prevent damage to the first filter unit 21 and the second filter unit 22 during subsequent preparation of a third filter unit 23. As shown in FIG. 6f, a second protective unit 321 is illustrated in FIG. 6f.

Exemplarily, a material of the second protective unit 321 may be a metal, such as copper (Cu), aluminum (Al), molybdenum-niobium alloy (MoNb), molybdenum-nickel-titanium alloy (MoNiTi), or the like, which are not easy to be dry-etched. The material of the second protective unit 321 may be the same as that of the first protective unit 311. In addition, for light shielding purposes, a thickness of the second protective unit 321 may not be less than 500 Å, and an edge of each second protective unit 321 may exceed an edge of the first surface of the first filter unit 21 and an edge of the first surface of the second filter unit 22 by 0.5 um to 3 um.

Figure 6G:
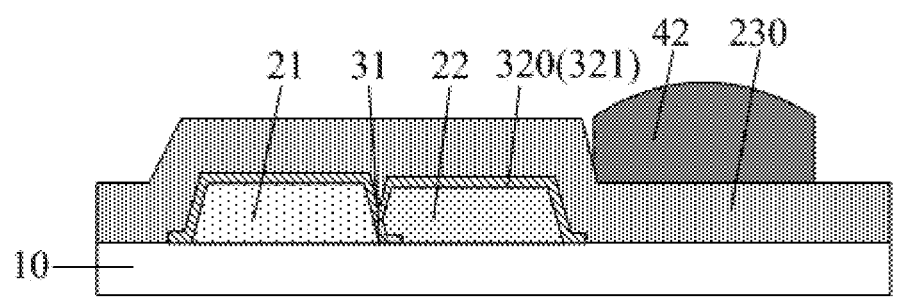
FIG. 6g is a schematic diagram of a partial cross-sectional structure of a color filter after forming a second photoresist according to some other exemplary embodiments.
Figure 6H:
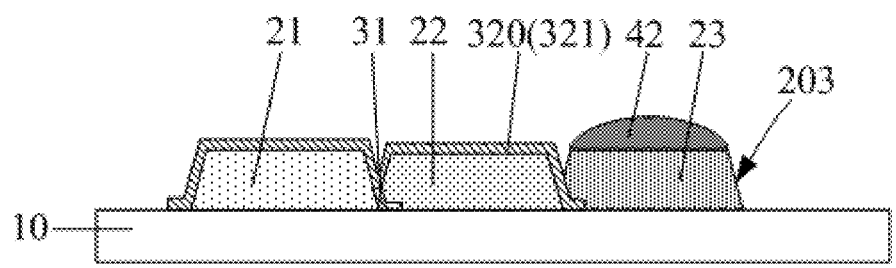
FIG. 6h is a schematic diagram of a partial cross-sectional structure of a color filter after forming a plurality of third filter units according to some other exemplary embodiments.

(5) A plurality of layers of dielectric films are deposited on the base substrate 10 on which the aforementioned patterns have been formed to form a third filter thin film 230, and the third filter thin film 230 is patterned to form a plurality of third filter units 23. A third filter unit 23 overlaps the second filter unit 22 adjacent thereto, and the third filter unit 23 overlaps the first filter unit 21 adjacent thereto. The third filter unit 23 at least partially covers the second protective unit 321 on the third surface 201 of the first filter unit 21 adjacent thereto, and the third filter unit 23 at least partially covers the second protective unit 321 on the third surface 202 of the second filter unit 22 adjacent thereto. Exemplarily, the third filter unit 23 covers the second protective unit 321 on the third surface 202 of the second filter unit 22 adjacent thereto at an end close to the base substrate 10, and the third filter unit 23 covers the second protective unit 321 on the third surface 201 of the first filter unit 21 adjacent thereto at an end close to the base substrate 10. For high PPI products, adjacent filter units transmitting light of different colors will inevitably overlap. Exemplarily, the third filter unit 23 includes a first surface facing the base substrate 10, a second surface facing away from the base substrate 10, and a third surface 203 connecting the first surface and the second surface. A cross-sectional shape of the third filter unit 23 may be trapezoidal, as shown in FIGS. 6g and 6h. The process of patterning the third filter thin film 230 to form the plurality of third filter units 23 may include processes of photoresist coating, mask exposure, development, etching, and the like. The photoresist (second photoresist 42) after development in this process is illustrated in FIGS. 6g and 6h.

Figure 6I:
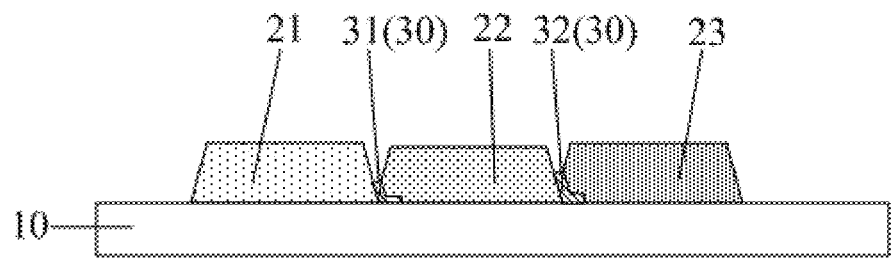
FIG. 6i is a schematic diagram of a partial cross-sectional structure of a color filter after forming a second light shielding layer according to some other exemplary embodiments.

Subsequently, the plurality of second protective units 321 may be etched by wet etching to remove the second protective units 321 on the second surfaces of the first filter units 21 and the second protective units 321 on the second surfaces of the second filter units 22 retain the second protective units 321 covered by the third filter units 23 on the third surfaces 201 of the first filter units 21, and retain the second protective units 321 covered by the third filter units 23 on the third surfaces 202 of the second filter units 22. The second protective units 321 retained on the third surfaces 201 of the first filter units 21 and the second protective units 321 retained on the third surfaces 202 of the second filter units 22 are a second light shielding layer 32. The light shielding layer 30 between the adjacent first filter unit 21 and the second filter unit 22 is the first light shielding layer 31, the light shielding layer 30 between the adjacent first filter unit 21 and the third filter unit 23 is the second light shielding layer 32, and the light shielding layer 30 between the adjacent second filter unit 22 and the third filter unit 23 is the second light shielding layer 32, as shown in FIGS. 6i and 3.

Based on the color filter illustrated in FIG. 3 and the preparation process of the color filter illustrated in FIGS. 6a to 6i, an embodiment of the present disclosure further provides a preparation method for a color filter, including:

forming a plurality of first filter units on a base substrate, each of the first filter units including a first surface facing the base substrate, a second surface facing away from the base substrate, and a third surface connecting the first surface and the second surface;

forming a first protective layer on a side of the plurality of first filter units away from the base substrate, the first protective layer including a plurality of first protective units that completely cover the first filter units;

forming a plurality of second filter units on the base substrate, a second filter unit at least partially covering a first protective unit on a third surface of a first filter unit adjacent thereto, each of the second filter units including a first surface facing the base substrate, a second surface facing away from the base substrate, and a third surface connecting the first surface and the second surface;

etching the plurality of first protective units to remove the first protective units on the second surfaces of the first filter units and retain the first protective units covered by the second filter units on the third surfaces of the first filter units, the first protective units retained on the third surfaces of the first filter units being a first light shielding layer;

forming a second protective layer on a side of the plurality of first filter units and the plurality of second filter units away from the base substrate, the second protective layer including a plurality of second protective units that cover adjacent first filter unit and second filter unit;

forming a plurality of third filter units on the base substrate, a third filter unit at least partially covers a second protective unit on a third surface of a first filter unit adjacent thereto, and the third filter unit at least partially covers a second protective unit on a third surface of a second filter unit adjacent thereto; and etching the plurality of second protective units to remove the second protective units on the second surfaces of the first filter units and the second protective units on the second surfaces of the second filter units, retain the second protective units covered by the third filter units on the third surfaces of the first filter units, and retain the second protective units covered by the third filter units on the third surfaces of the second filter units, the second protective units retained on the third surfaces of the first filter units and the second protective units retained on the third surfaces of the second filter units are a second light shielding layer.

In some further exemplary embodiments, taking the color filter illustrated in FIG. 4 as an example, the preparation process of the color filter may include the following operations.

Figures 1, 7A:
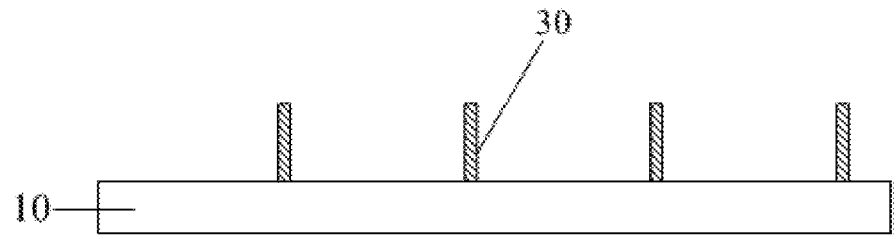
Figures 2, 7A:
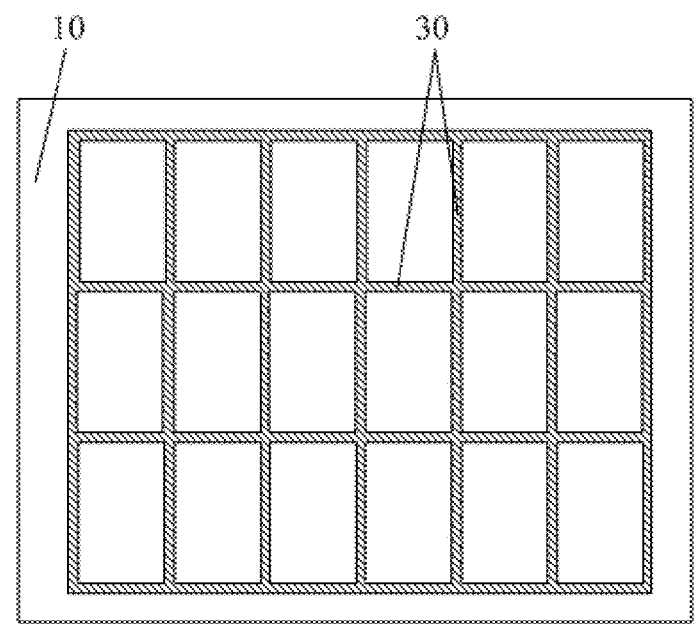

(1) A copper (Cu) metal grid is prepared on a glass substrate 10 by an electroplating process to form a light shielding layer 30, as shown in FIGS. 7a-1 and 7a-2. FIG. 7a-1 is a schematic diagram of a partial cross-sectional structure of a color filter after forming a light shielding layer 30 according to some exemplary embodiments, and FIG. 7a-2 is a schematic top view of a structure of a color filter after forming a light shielding layer 30 according to some exemplary embodiments.

Exemplarily, the copper metal grid may be prepared by an additive method. In consideration of the high PPI requirement, a width of the copper metal may be 1 um to 3 um, and a height of the copper metal grid may be increased by 2 um to 5 um according to a thickness of the filter unit, which may have the effect of completely isolating adjacent filter units. The copper metal grid may play a role in shielding light and preventing light crosstalk between two adjacent filter units which are subsequently formed and transmit light of different colors.

Figure 7B:
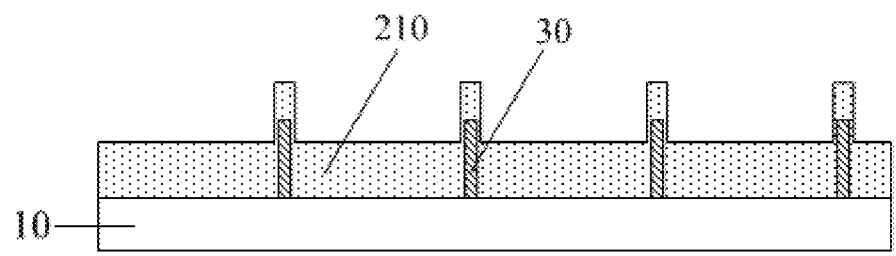
FIG. 7b is a schematic diagram of a partial cross-sectional structure of a color filter after forming a first filter thin film according to some further exemplary embodiments.
Figure 7C:
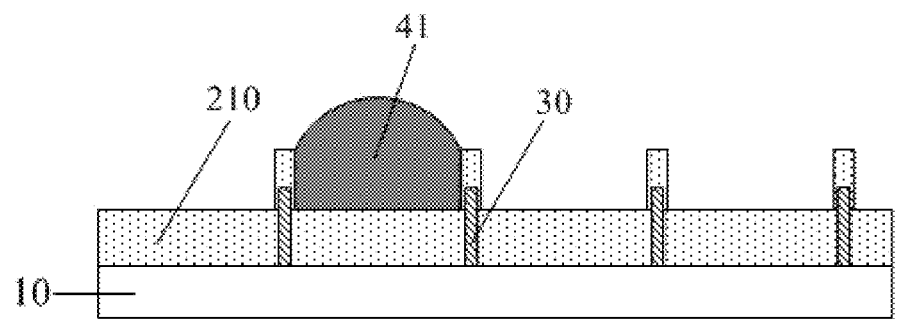
FIG. 7c is a schematic diagram of a partial cross-sectional structure of a color filter after forming a first photoresist according to some further exemplary embodiments.
Figures 1, 7D:
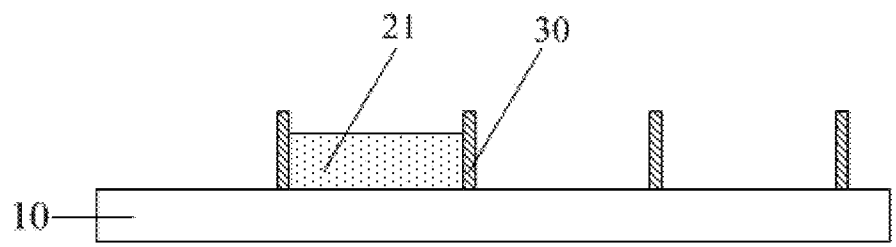
Figures 2, 7D:
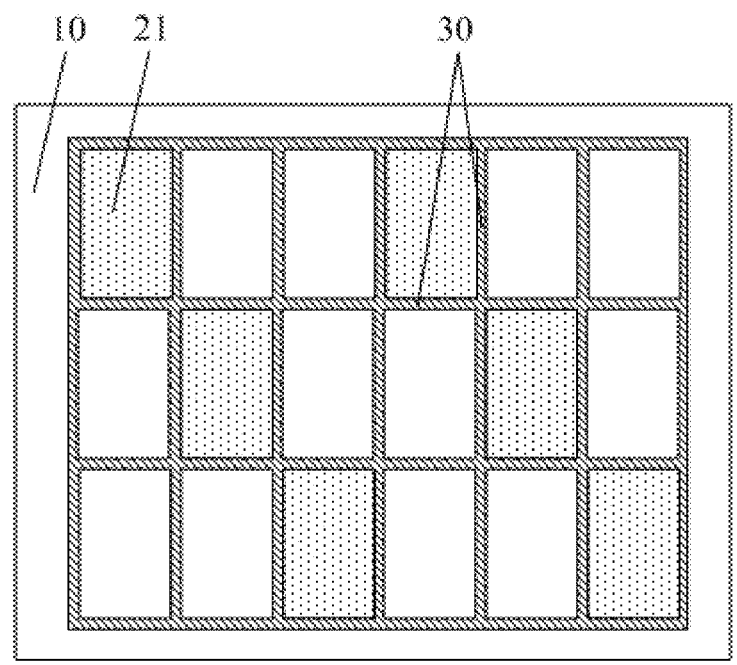

(2) A plurality of layers of dielectric films are deposited on the glass substrate 10 to form a first filter thin film 210, as shown in FIG. 7b, and the first filter thin film 210 is patterned to form a plurality of first filter units 21 which are located in a plurality of first grid holes of the copper metal grid. As shown in FIGS. 7d-1 and 7d-2, FIG. 7d-1 is a schematic diagram of a partial cross-sectional structure of a color filter after forming a plurality of first filter units 21 according to some exemplary embodiments, and FIG. 7d-2 is a schematic top view of a structure of a color filter after forming a plurality of first filter units 21 according to some exemplary embodiments. FIG. 7d-1 illustrates one first filter unit 21, and FIG. 7d-2 illustrates a plurality of first filter units 21.

The process of patterning the first filter thin film 210 to form the plurality of first filter units 21 may include processes of photoresist coating, mask exposure, development, etching, and the like. FIG. 7c is a schematic diagram of a structure of a color filter after developing photoresist (first photoresist 41) in a process of patterning to form a plurality of first filter units 21 according to some exemplary embodiments.

Figure 7E:
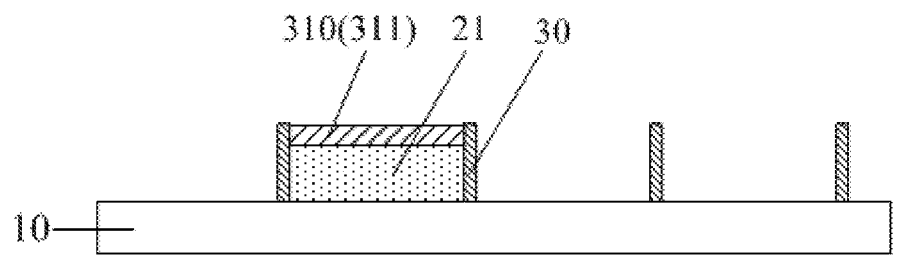
FIG. 7e is a schematic diagram of a partial cross-sectional structure of a color filter after forming a first protective layer according to some further exemplary embodiments.

(3) A first protective thin film is deposited on the base substrate 10 on which the aforementioned pattern has been formed, and the first protective thin film is patterned to form a first protective layer 310. The first protective layer 310 includes a plurality of first protective units 311, which correspondingly cover the plurality of first filter units 21, and each first filter unit 21 may be completely covered by a first protective unit 311. The first protective unit 311 may prevent damage to the first filter unit 21 during subsequent preparation of a second filter unit 22 or a third filter unit 23. As shown in FIG. 7e, a first filter unit 21 and a first protective unit 311 are illustrated in FIG. 7c.

Exemplarily, a material of the first protective unit 311 may be a metal other than copper, such as aluminum (Al), molybdenum-niobium alloy (MoNb), molybdenum-nickel-titanium alloy (MoNiTi), or the like.

Figure 7F:
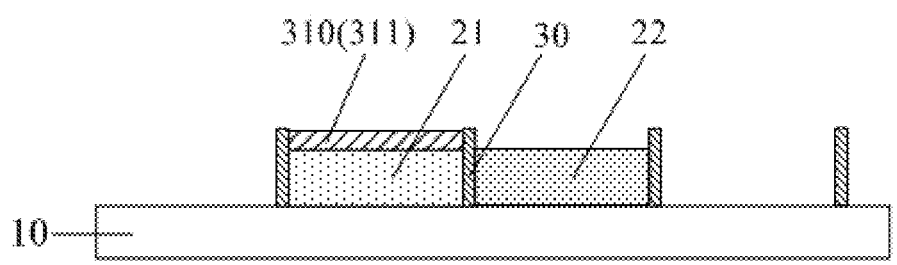
FIG. 7f is a schematic diagram of a partial cross-sectional structure of a color filter after forming a plurality of second filter units according to some further exemplary embodiments.

(4) A plurality of layers of dielectric films are deposited on the base substrate 10 on which the aforementioned patterns have been formed to form a second filter thin film, and the second filter thin film is patterned to form a plurality of second filter units 22. The plurality of second filter units 22 are located in a plurality of second grid holes of the copper metal grid, as shown in FIG. 7f.

Figure 7G:
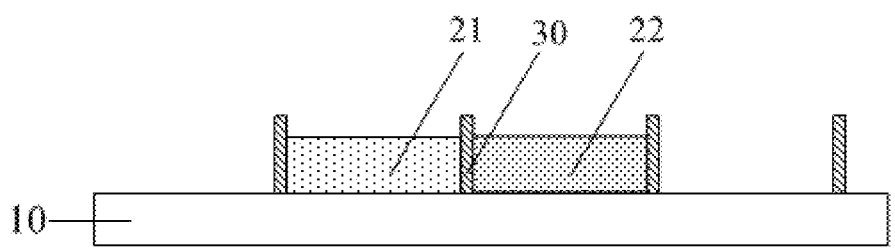
FIG. 7g is a schematic diagram of a partial cross-sectional structure of a color filter after removing a first protective layer according to some further exemplary embodiments.

Subsequently, the plurality of first protective units 311 are removed to expose a surface of the first filter unit 21 away from the base substrate 10, as shown in FIG. 7g.

Figure 7H:
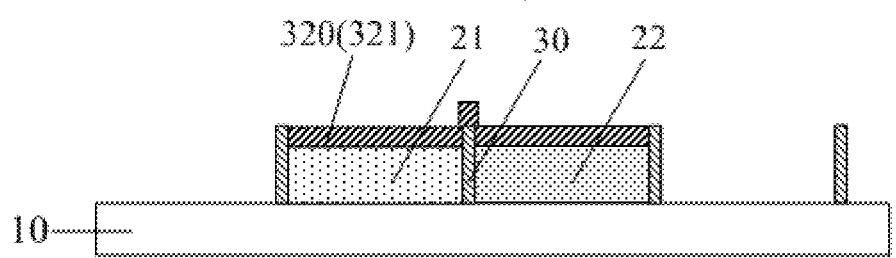
FIG. 7h is a schematic diagram of a partial cross-sectional structure of a color filter after forming a second protective layer according to some further exemplary embodiments.

(5) A second protective thin film is deposited on the base substrate 10 on which the aforementioned patterns have been formed, and the second protective thin film is patterned to form a second protective layer 320. The second protective layer 320 includes a plurality of second protective units 321, and each second protective unit 321 completely covers a first filter unit 21 and a second filter unit 22 adjacent to the first filter unit 21. The second protective unit 321 may prevent damage to the first filter unit 21 and the second filter unit 22 during subsequent preparation of a third filter unit 23. As shown in FIG. 7h, a second protective unit 321 is illustrated in FIG. 7h.

Exemplarily, a material of the second protective unit 321 may be a metal other than copper, such as aluminum (Al), molybdenum-niobium alloy (MoNb), molybdenum-nickel-titanium alloy (MoNiTi), or the like. The material of the second protective unit 321 may be the same as that of the first protective unit 311.

Figure 7I:
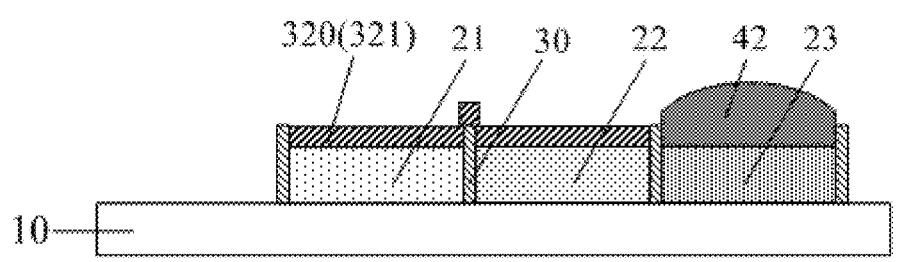
FIG. 7i is a schematic diagram of a partial cross-sectional structure of a color filter after forming a plurality of third filter units according to some further exemplary embodiments.

(6) A plurality of layers of dielectric films are deposited on the base substrate 10 on which the aforementioned patterns have been formed to form a third filter thin film, and the third filter thin film is patterned to form a plurality of third filter units 23. The plurality of third filter units 23 are located in a plurality of third grid holes of the copper metal grid, as shown in FIG. 7i.

The process of patterning the third filter thin film to form the plurality of third filter units 23 may include processes of photoresist coating, mask exposure, development, etching, and the like. FIG. 7i is a schematic diagram of a structure of a color filter after developing photoresist (second photoresist 42) in a process of patterning to form a plurality of third filter units 23 according to some exemplary embodiments.

Figure 7J:
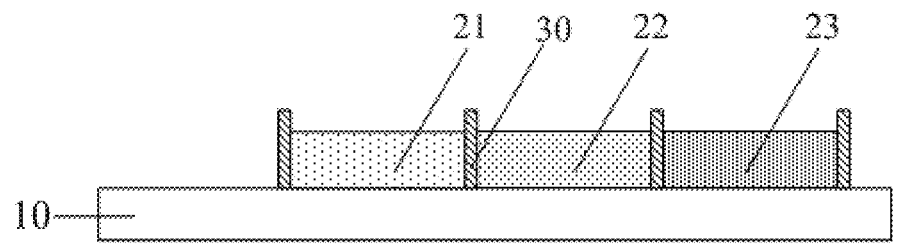
FIG. 7j is a schematic diagram of a partial cross-sectional structure of a color filter after removing a second protective layer according to some further exemplary embodiments.

Subsequently, the plurality of second protective units 321 are removed to expose a surface of the first filter units 21 away from the base substrate 10 and a surface of the second filter units 22 away from the base substrate 10, as shown in FIG. 7j.

(7) A thickness of the copper metal grid is reduced by a wet etching process, so that the thickness of the copper metal grid is approximately the same as a thickness of the filter unit, and a difference between the thickness of the copper metal grid and the thickness of the filter unit may be within ±1 um, as shown in FIG. 4. In the wet etching process, because of the wettability of wet etching, it is necessary to control the etching time to prevent the thickness of copper metal grid from being too small.

Based on the color filter illustrated in FIG. 4 and the preparation process of the color filter illustrated in FIGS. 7a to 7j, an embodiment of the present disclosure further provides a preparation method for a color filter, including:
   forming a light shielding layer on a base substrate, the light shielding layer being of a grid-like structure;
   forming a plurality of first filter units on the base substrate, the plurality of first filter units being located in a plurality of first grid holes of the light shielding layer;
   forming a first protective layer on a side of the plurality of first filter units away from the base substrate, the first protective layer including a plurality of first protective units that completely cover the first filter units;
   forming a plurality of second filter units on the base substrate, the plurality of second filter units being located in a plurality of second grid holes of the light shielding layer;
   removing the plurality of first protective units to expose a surface of the first filter units away from the base substrate;
   forming a second protective layer on a side of the plurality of first filter units and the plurality of second filter units away from the base substrate, the second protective layer including a plurality of second protective units that cover adjacent first filter unit and second filter unit;
   forming a plurality of third filter units on the base substrate, the plurality of third filter units being located in a plurality of third grid holes of the light shielding layer; and
   removing the plurality of second protective units to expose a surface of the first filter units away from the base substrate and a surface of the second filter units away from the base substrate.

Figure 8:
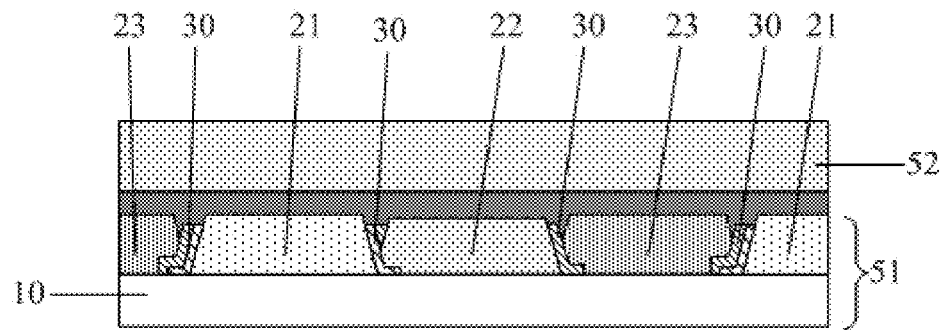
FIG. 8 is a schematic diagram of a partial cross-sectional structure of an array substrate according to some exemplary embodiments.

An embodiment of the present disclosure further provides an array substrate, as shown in FIG. 8, which is a schematic diagram of a partial cross-sectional structure of an array substrate according to some exemplary embodiments. The array substrate includes a color filter 51 according to the embodiment of the present disclosure. The array substrate further includes a circuit structure layer 52 provided on a side of a plurality of filter units away from the base substrate 10. The circuit structure layer 52 includes a transistor, a gate line, a data line and a first electrode. The transistor includes a gate electrode connected to the gate line, an active layer, a source electrode connected to the data line, and a drain electrode connected to the first electrode.

An embodiment of the present disclosure further provides a display device, including the color filter according to the embodiment of the present disclosure. The display device may be any product or component with a display function, such as a mobile phone, a tablet computer, a television, a display, a laptop computer, a digital photo frame, and a navigator.

Figure 9:
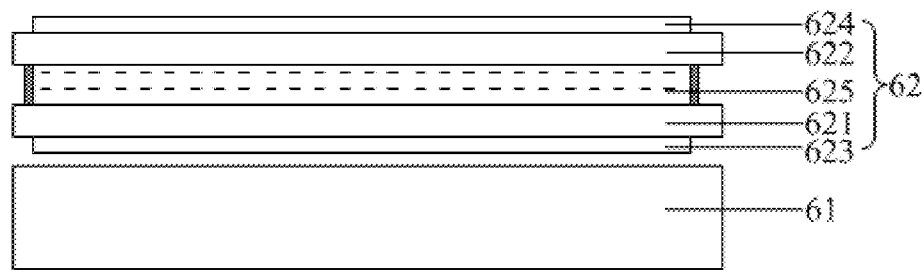
FIG. 9 is a schematic diagram of a structure of a display device according to some exemplary embodiments.

In some exemplary embodiments, as shown in FIG. 9, which is a schematic diagram of a structure of a display device according to some exemplary embodiments, the display device may be a liquid crystal display device. The display device includes a backlight assembly 61 and a display panel 62 provided on a light-emitting side of the backlight assembly 61. The display panel 62 includes a color film substrate 621 and an array substrate 622 that are cell-assembled, a liquid crystal 625 provided between the array substrate 622 and the color film substrate 621, an upper polarizer 624 provided on a side of the array substrate 622 facing away from the color film substrate 621, and a lower polarizer 623 provided on a side of the color film substrate 621 facing away from the array substrate 622. The color film substrate 621 includes the color filter according to the embodiment of the present disclosure. The color film substrate 621 may be provided between the array substrate 622 and the backlight assembly 61.

Figure 10:
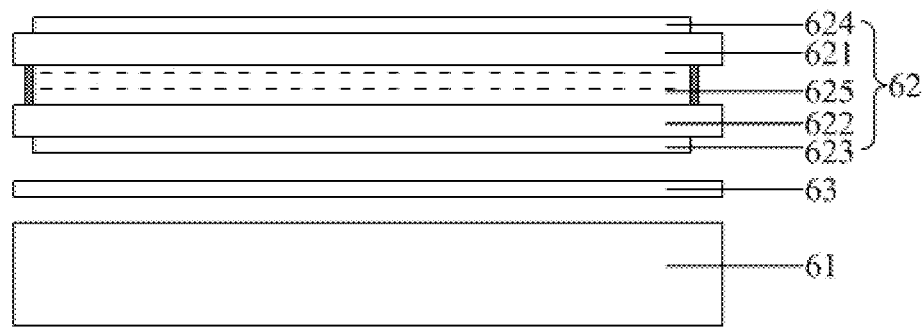
FIG. 10 is a schematic diagram of a structure of a display device according to some other exemplary embodiments.

In other exemplary embodiments, as shown in FIG. 10, which is a schematic diagram of a structure of a display device according to some other exemplary embodiments, the display device may be a liquid crystal display device. The display device includes a backlight assembly 61, a display panel 62 provided on a light-emitting side of the backlight assembly 61, and a color filter 63 according to the embodiment of the present disclosure provided between the display panel 62 and a light-emitting surface of the backlight assembly 61. The display panel 62 includes a color film substrate 621 and an array substrate 622 that are cell-assembled, a liquid crystal 625 provided between the array substrate 622 and the color film substrate 621, a lower polarizer 623 provided on a side of the array substrate 622 facing away from the color film substrate 621, and an upper polarizer 624 provided on a side of the color film substrate 621 facing away from the array substrate 622. The array substrate 622 may be provided between the color film substrate 621 and the backlight assembly 61. In other embodiments, the color filter 63 may be provided between the array substrate 622 and the lower polarizer 623.

In the accompanying drawings, a size of a constituent element, and a thickness of a layer or a region are sometimes exaggerated for clarity. Therefore, an implementation of the present disclosure is not necessarily limited to the size, and the shape and size of each component in the drawings do not reflect an actual scale. In addition, the drawings schematically illustrate some examples, and an implementation of the present disclosure is not limited to the shapes or numerical values shown in the drawings.

In the description herein, "parallel" refers to a state in which an angle formed by two straight lines is above −10° and below 10°, and thus includes a state in which the angle is above −5° and below 5°. In addition, "perpendicular" refers to a state in which an angle formed by two straight lines is above 80° and below 100°, and thus includes a state in which the angle is above 85° and below 95°.

In the description herein, orientation or position relationships indicated by the terms "upper", "lower", "left", "right", "top", "inside", "outside", "axial", "tetragonal" and the like are orientation or position relationships shown in the drawings, and are intended to facilitate description of the embodiments of the present disclosure and simplification of the description, but not to indicate or imply that the mentioned structure has a specific orientation or is constructed and operated in a specific orientation, therefore, they should not be understood as limitations on the present disclosure.

In the description herein, unless otherwise specified and defined explicitly, terms "connection", "fixed connection", "installation", and "assembly" should be understood in a broad sense, and, for example, may be a fixed connection, a detachable connection, or an integrated connection; terms "installation", "connection", and "fixed connection" may be a direct connection, an indirect connection through an intermediary, or communication inside two elements. For those ordinarily skilled in the art, meanings of the above terms in the embodiments of the present disclosure may be understood according to situations.

The invention claimed is:

1. A color filter, comprising a plurality of filter units provided on a base substrate for transmitting light of different colors, and a light shielding layer located between adjacent filter units for transmitting light of different colors, wherein each of the filter units comprises a first surface facing the base substrate, a second surface facing away from the base substrate, and a third surface connecting the first surface and the second surface, and the light shielding layer is provided on the third surface of at least one of two adjacent filter units for transmitting light of different colors;
   wherein adjacent filter units transmitting light of different colors have overlapping portions, and the light shielding layer is at least partially located between the overlapping portions;
   wherein a portion of the light shielding layer is located on a third surface of an overlapping portion, and the other portion of the light shielding layer extends in a direction parallel to the base substrate and forms an extending portion;
   wherein the light shielding layer completely covers an edge of the third surface close to the base substrate and partially extends in a direction parallel to the base substrate, and the extending portion is located between a corresponding filter unit and the base substrate.

2. The color filter according to claim 1, wherein the plurality of filter units comprise a plurality of first filter units transmitting light of a first color, a plurality of second filter units transmitting light of a second color, and a plurality of third filter units transmitting light of a third color, and the light shielding layer is not provided on third surfaces of the plurality of first filter units or the plurality of second filter units or the plurality of third filter units.

3. The color filter according to claim 1, wherein the plurality of filter units comprise a plurality of first filter units transmitting light of a first color, a plurality of second filter units transmitting light of a second color, and a plurality of third filter units transmitting light of a third color; and
   a first filter unit or a second filter unit or a third filter unit is used as a reference filter unit, the light shielding layer between the reference filter unit and a filter unit adjacent thereto comprises a first light shielding layer and a second light shielding layer, the first light shielding layer is provided on a third surface of the reference filter unit, and the second light shielding layer is provided at least partially on a side of the first light shielding layer away from the reference filter unit.

4. The color filter according to claim 1, wherein at least two adjacent filter units transmitting light of different colors have overlapping portions, and an orthographic projection of the light shielding layer on the base substrate comprises an orthographic projection of the overlapping portions on the base substrate.

5. The color filter according to claim 1, wherein orthographic projections of third surfaces of at least two adjacent filter units transmitting light of different colors on the base substrate overlap, and orthographic projections of the second surfaces the at least two adjacent filter units transmitting light of different colors on the base substrate do not overlap.

6. The color filter according to claim 1, wherein the light shielding layer is not provided on third surfaces of non-overlapping portions of adjacent filter units transmitting light of different colors.

7. The color filter according to claim 1, wherein the light shielding layer extends from 0.5 um to 3 um in the direction parallel to the base substrate.

8. The color filter according to claim 1, wherein a slope angle of the third surface of at least one of two adjacent filter units transmitting light of different colors is 70 degrees to 90 degrees.

9. The color filter according to claim 1, wherein a material of the light shielding layer is copper.

10. The color filter according to claim 1, wherein the filter units comprise a plurality of stacked inorganic film layers.

11. An array substrate, comprising the color filter according to claim 1, and a circuit structure layer provided on a side of the plurality of filter units away from the base substrate, wherein the circuit structure layer comprises a transistor, a gate line, a data line and a first electrode, and the transistor comprises a gate electrode connected to the gate line, an active layer, a source electrode connected to the data line, and a drain electrode connected to the first electrode.

12. A display device, comprising the color filter according to claim 1.

13. A preparation method for a color filter, comprising:
   forming a plurality of first filter units on a base substrate, wherein each of the first filter units comprises a first surface facing the base substrate, a second surface facing away from the base substrate, and a third surface connecting the first surface and the second surface;
   forming a first protective layer on a side of the plurality of first filter units away from the base substrate, wherein the first protective layer comprises a plurality of first protective units that completely cover the first filter units;
   forming a plurality of second filter units on the base substrate, wherein each of the second filter units comprises a first surface facing the base substrate, a second surface facing away from the base substrate, and a third surface connecting the first surface and the second surface;
   etching the plurality of first protective units to completely remove the first protective units on the second surfaces of the first filter units and at least partially retain the first protective units on the third surfaces of the first filter units; or etching the plurality of first protective units to remove the first protective units on the second surfaces of the first filter units, and retain the first protective units covered by the second filter units on the third surfaces of the first filter units, wherein the first protective units retained on the third surfaces of the first filter units are a first light shielding layer;

forming a second protective layer on a side of the plurality of first filter units and the plurality of second filter units away from the base substrate, wherein the second protective layer comprises a plurality of second protective units that cover adjacent first filter unit and second filter unit;

forming a plurality of third filter units on the base substrate; and etching the plurality of second protective units to remove the second protective units on the second surfaces of the first filter units and the second protective units on the second surfaces of the second filter units, at least partially retain the second protective units on the third surfaces of the second filter units, and at least partially retain the second protective units on the first light shielding layer, wherein the second protective units retained on the third surfaces of the second filter units and the second protective units retained on the first light shielding layer are a second light shielding layer; or etching the plurality of second protective units to remove the second protective units on the second surfaces of the first filter units and the second protective units on the second surfaces of the second filter units, retain the second protective units covered by the third filter units on the third surfaces of the first filter units, and retain the second protective units covered by the third filter units on the third surfaces of the second filter units, wherein the second protective units retained on the third surfaces of the first filter units and the second protective units retained on the third surfaces of the second filter units are a second light shielding layer.

14. The preparation method for a color filter according to claim 13, wherein a second filter unit at least partially covers a first protective unit on a third surface of a first filter unit adjacent thereto; and wherein a third filter unit at least partially covers a second protective unit on a third surface of a first filter unit adjacent thereto, and the third filter unit at least partially covers a second protective unit on a third surface of a second filter unit adjacent thereto.

15. A preparation method for a color filter, comprising:

forming a light shielding layer on a base substrate, wherein the light shielding layer is of a grid-like structure;

forming a plurality of first filter units on the base substrate, wherein the plurality of first filter units are located in a plurality of first grid holes of the light shielding layer;

forming a first protective layer on a side of the plurality of first filter units away from the base substrate, wherein the first protective layer comprises a plurality of first protective units that completely cover the first filter units;

forming a plurality of second filter units on the base substrate, wherein the plurality of second filter units are located in a plurality of second grid holes of the light shielding layer;

removing the plurality of first protective units to expose a surface of the first filter units away from the base substrate;

forming a second protective layer on a side of the plurality of first filter units and the plurality of second filter units away from the base substrate, wherein the second protective layer comprises a plurality of second protective units that cover adjacent first filter unit and second filter unit;

forming a plurality of third filter units on the base substrate, wherein the plurality of third filter units are located in a plurality of third grid holes of the light shielding layer; and removing the plurality of second protective units to expose a surface of the first filter units away from the base substrate and a surface of the second filter units away from the base substrate.

16. An array substrate, comprising the color filter according to claim 2, and a circuit structure layer provided on a side of the plurality of filter units away from the base substrate, wherein the circuit structure layer comprises a transistor, a gate line, a data line and a first electrode, and the transistor comprises a gate electrode connected to the gate line, an active layer, a source electrode connected to the data line, and a drain electrode connected to the first electrode.

17. An array substrate, comprising the color filter according to claim 3, and a circuit structure layer provided on a side of the plurality of filter units away from the base substrate, wherein the circuit structure layer comprises a transistor, a gate line, a data line and a first electrode, and the transistor comprises a gate electrode connected to the gate line, an active layer, a source electrode connected to the data line, and a drain electrode connected to the first electrode.

18. A color filter, comprising a plurality of filter units provided on a base substrate for transmitting light of different colors, and a light shielding layer located between adjacent filter units for transmitting light of different colors, wherein each of the filter units comprises a first surface facing the base substrate, a second surface facing away from the base substrate, and a third surface connecting the first surface and the second surface, and the light shielding layer is provided on the third surface of at least one of two adjacent filter units for transmitting light of different colors;

the color filter is prepared according to the preparation method according to claim 15.

19. The color filter according to claim 18, wherein the light shielding layer is of a grid-like structure.

* * * * *